May 2, 1961     H. O. FUCHS ET AL     2,982,007
APPARATUS FOR SHOT PEENING ELONGATED ARTICLES
Filed Jan. 16, 1959     5 Sheets-Sheet 1
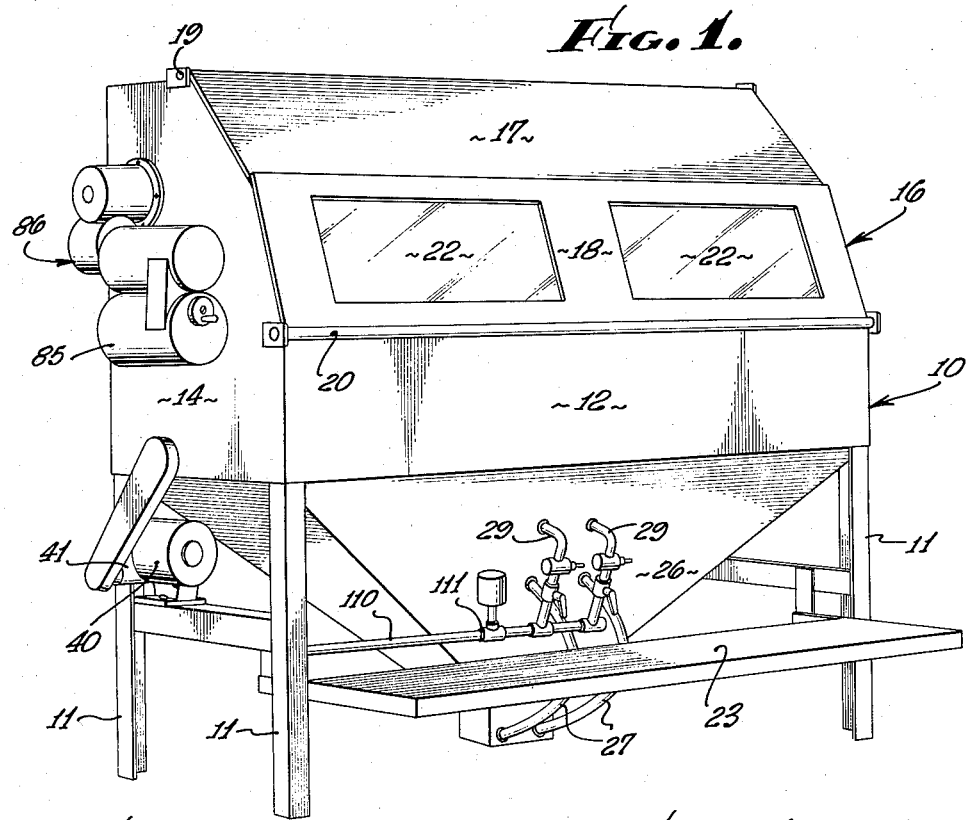
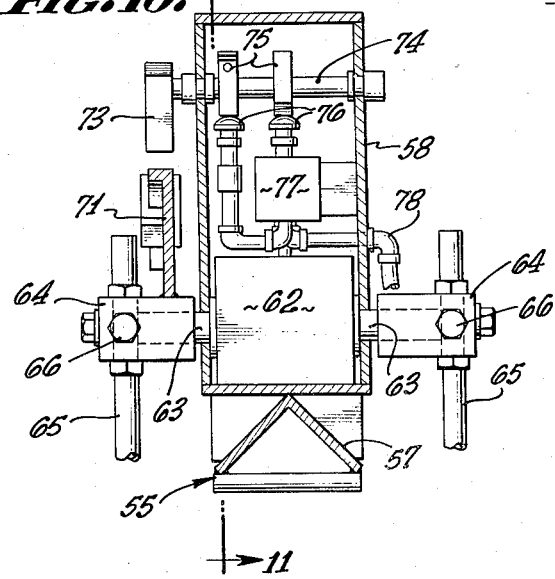
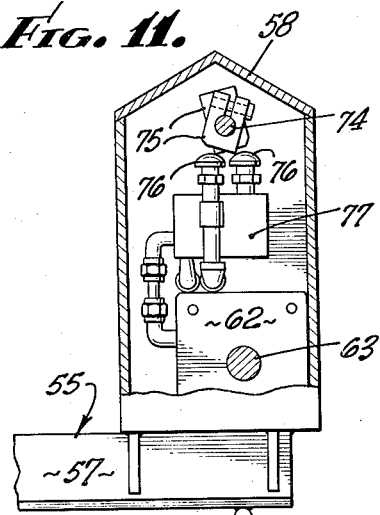
INVENTORS.
HENRY O. FUCHS
BY DANIEL J. NESIN
ATTORNEYS.

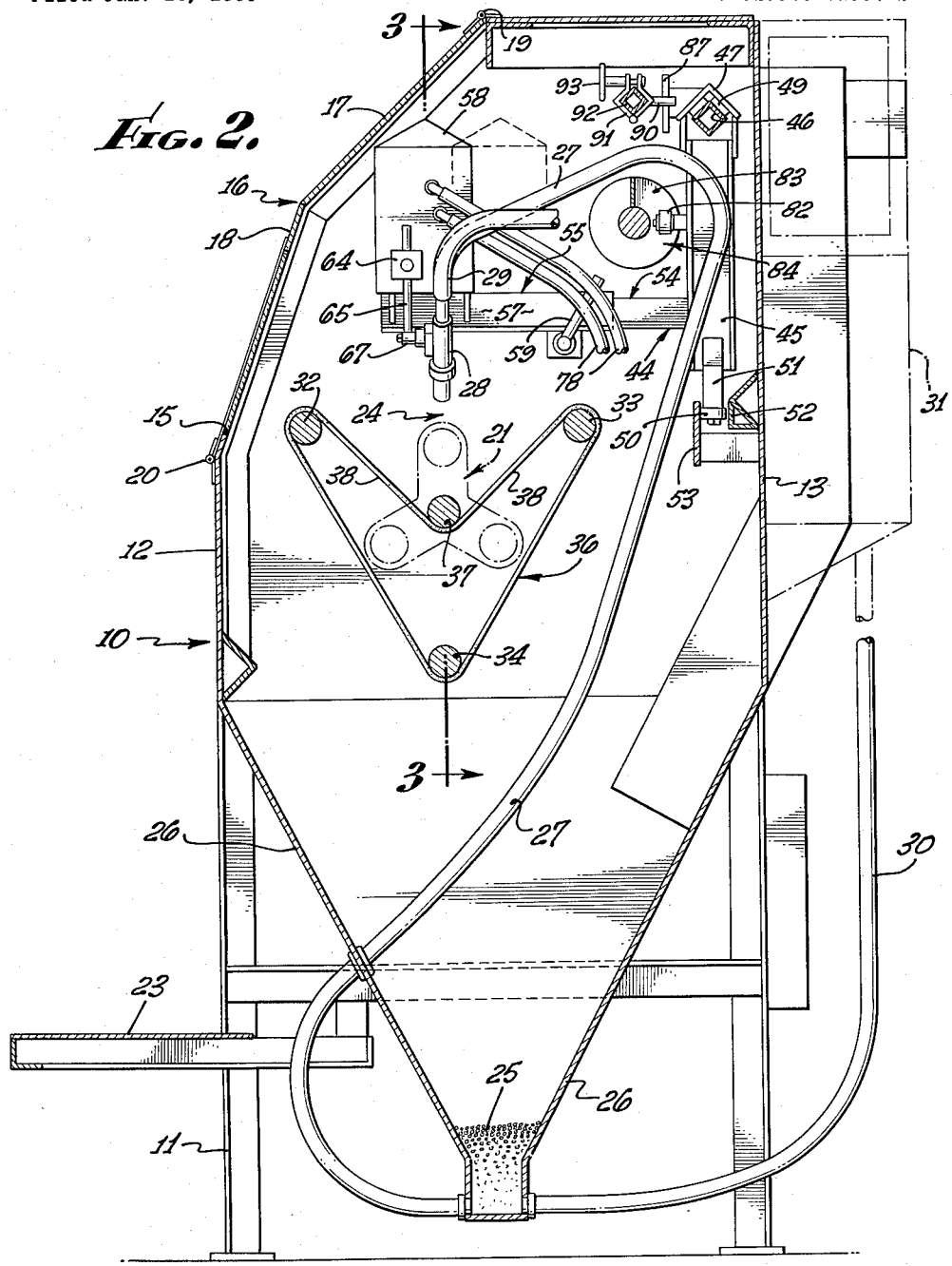

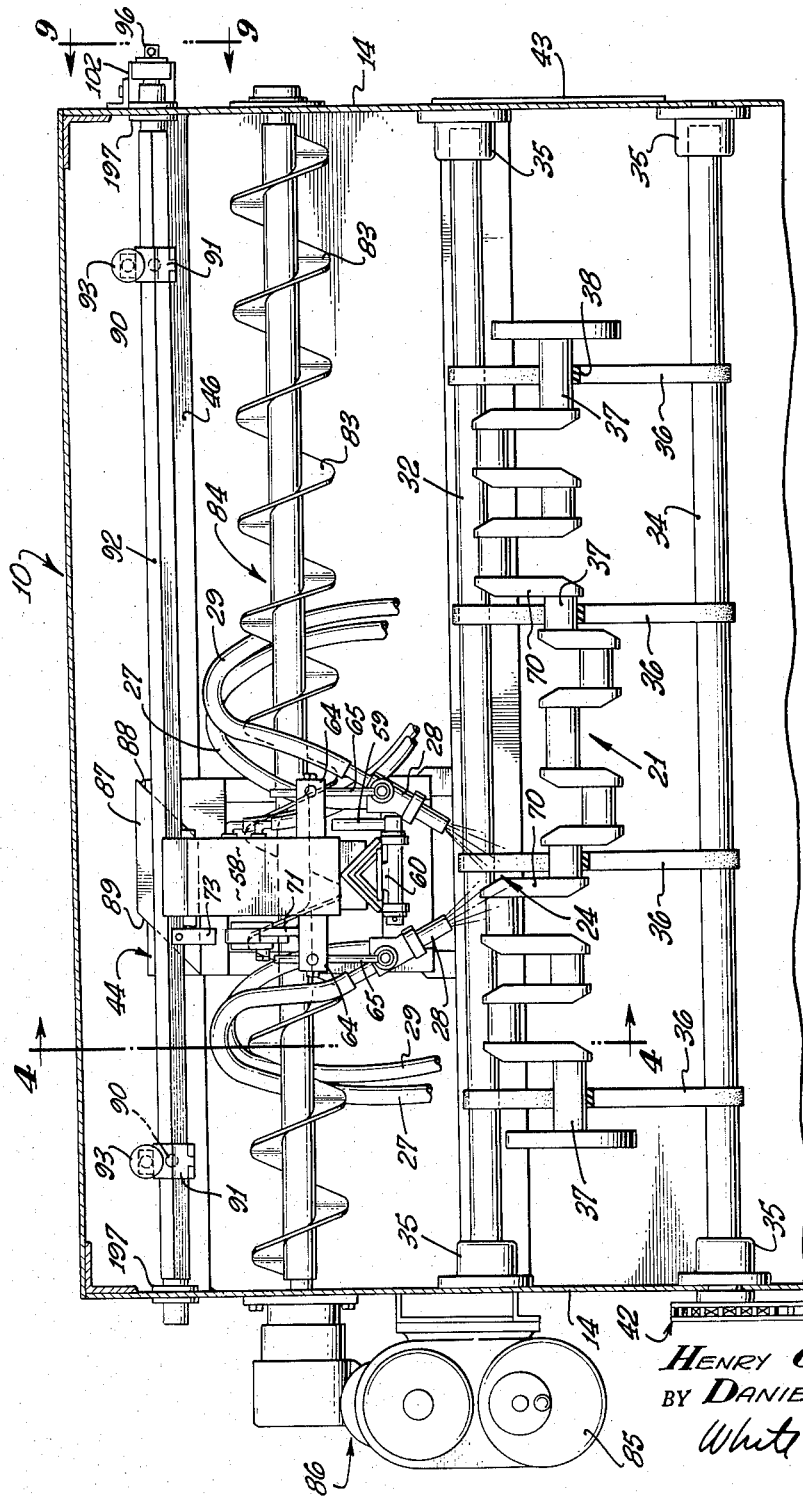

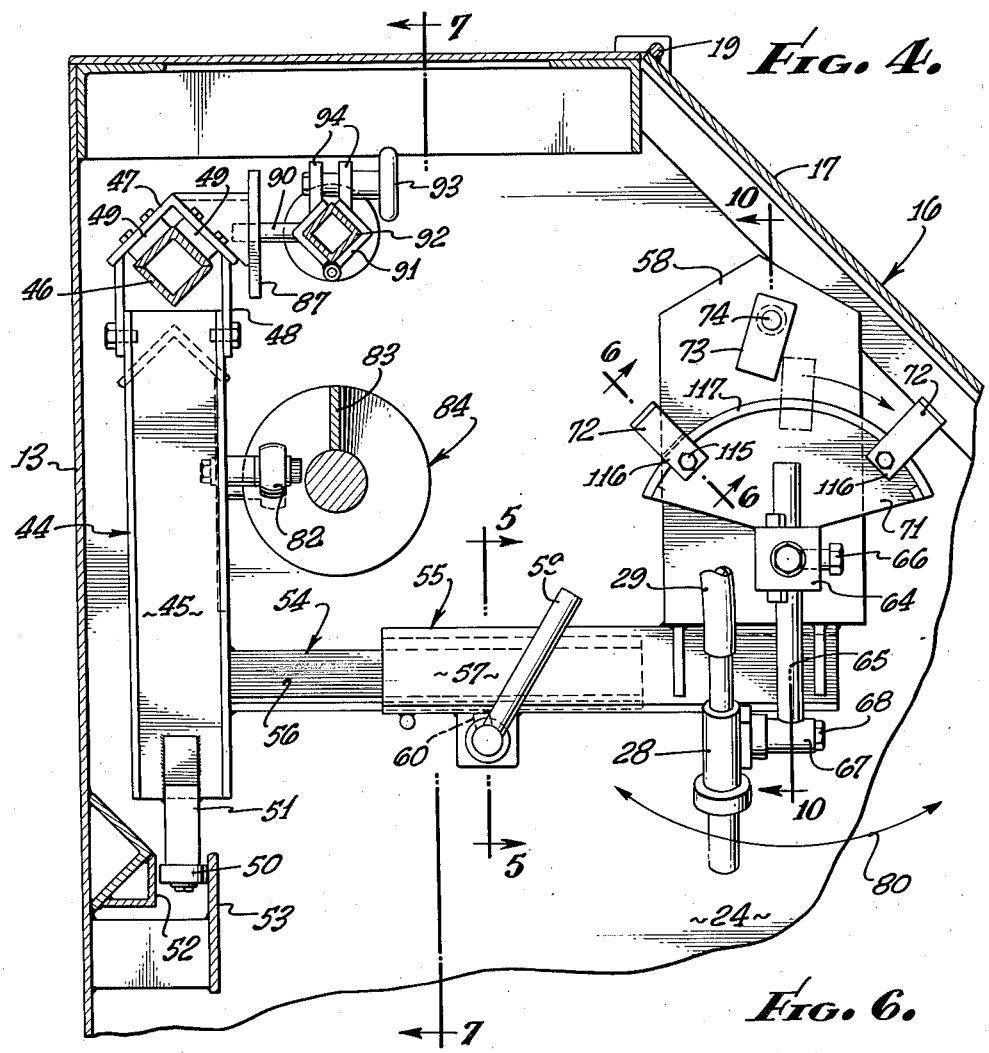

INVENTOR.
HENRY O. FUCHS
BY DANIEL J. NESIN

White & Haefliger
ATTORNEYS.

United States Patent Office 2,982,007
Patented May 2, 1961

2,982,007
APPARATUS FOR SHOT PEENING ELONGATED ARTICLES

Henry O. Fuchs, Altadena, and Daniel J. Nesin, Anaheim, Calif., assignors to Metal Improvement Equipment Company, Los Angeles, Calif., a corporation of California Filed Jan. 16, 1959, Ser. No. 787,223

6 Claims. (Cl. 29—90)

This invention relates generally to shot peening apparatus and more particularly has to do with peening equipment capable of handling and properly treating heavy crankshafts, for example of the size and weight that are encountered in large diesel railroad engines and in power plant diesels.

In the past such heavy crankshafts were supported on jigs and fixtures while being peened, such treatment tending over a rather short period of time to wear away or erode the jigs and fixtures necessitating their frequent replacement. Also, different sized crankshafts required the use of correspondingly different sized jigs and fixtures, involving undesirable expense and inventories of such equipment.

The present invention obviates these undesirable former practices through the provision of novel peening apparatus wherein endless flexible members are utilized both to support and rotate the heavy crankshaft. These members preferably comprising belt slings curving under the crankshaft at its main journals. Rotary means as for example horizontally and parallel extending rolls are provided to feed the belt slings under those journals continuously to rotate the crankshaft about a horizontal axis so that it may be subjected to thorough peening treatment by shot particles jetted from peening nozzles directed downwardly toward the crankshaft. At the same time, the peening nozzles are continuously oscillated along the crankshaft length and transversely thereof by apparatus to be described in detail.

As will be brought out, the belt slings are readily shiftable or adjustable lengthwise along belt support and drive rolls to match the main journal spacing of many different size crankshafts so that the present apparatus is extremely versatile as respects the handling of such different crankshafts. Furthermore, the belt slings occupy little space so that the size of the crankshaft peening apparatus as a whole may be much smaller than previously known equipment capable of peening heavy crankshafts.

Other details of the invention include a traveling assembly supporting the nozzles and a longitudinally extending shot-proof screw or helicoid conveyor operable to displace and oscillate the traveling assembly lengthwise relative to the rotating crankshaft. Space is conserved by locating that portion of the traveling assembly supporting the nozzles in operative peening position in the path of crankshaft insertion into and withdrawal from the peening cabinet or housing, the referred to nozzle carrying portion being shiftable to a nozzle peening inoperative position to permit such crankshaft insertion and withdrawal as desired. Further, the nozzles are rotatable or oscillatable in opposite laterally transverse direction over the crankshaft by an actuator, typically an air motor, the latter being controlled as to reversal of the direction of nozzle rotation by control means including limits rotated with the nozzles by the actuator.

These and other objects and advantages of the invention, as well as the details of an illustrative embodiment, will be more fully understood from the following detailed description of the drawings, in which:

Fig. 1 is a perspective view of the exterior of the peening apparatus;

Fig. 2 is a vertical section taken through the complete apparatus;

Fig. 3 is a section taken on line 3—3 of Fig. 2;

Fig. 4 is a section taken on line 4—4 of Fig. 3;

Fig. 5 is an enlarged section taken on line 5—5 of Fig. 4;

Fig. 6 is an enlarged fragmentary section taken on line 6—6 of Fig. 4;

Fig. 10 is a vertical frontal section taken on line 10—10 of Fig. 4 through the nozzle oscillator control box; and Fig. 11 is a view taken on line 11—11 of Fig. 10.

Figure 7:
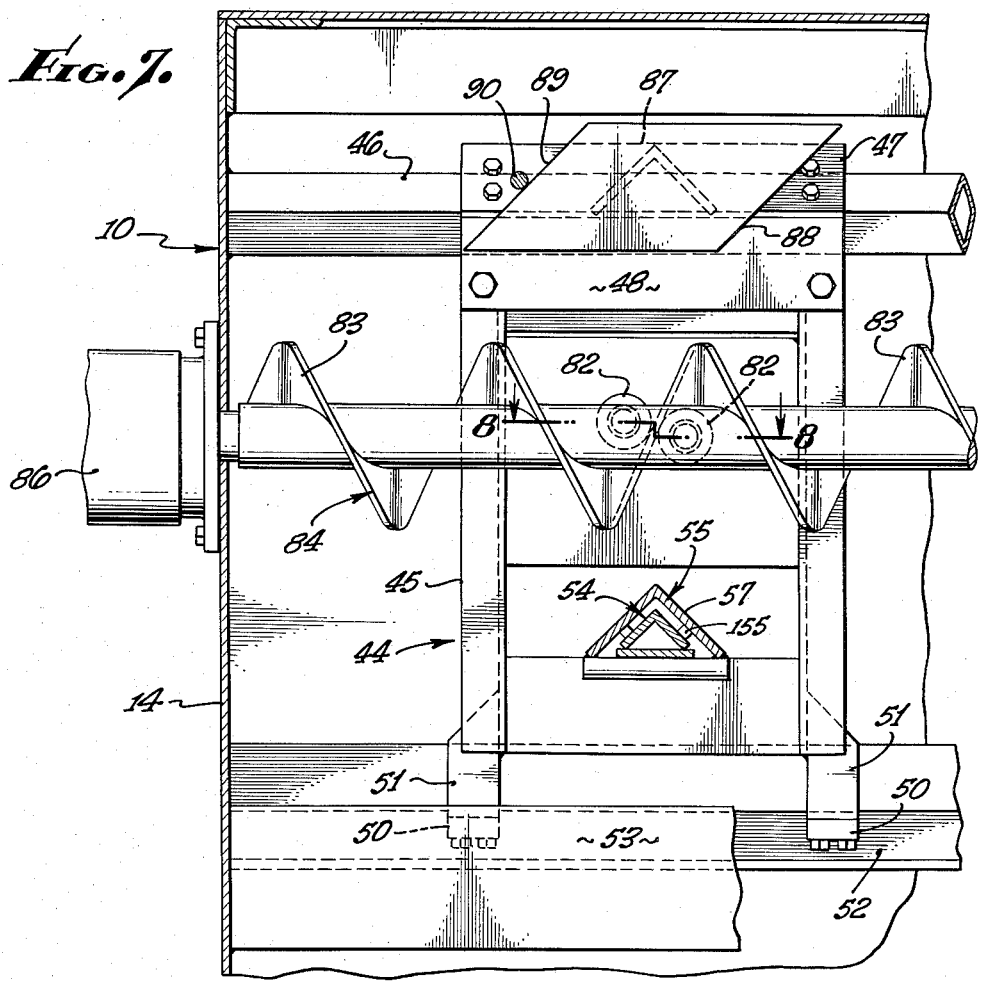
Fig. 7 is an enlarged section taken on line 7—7 of Fig. 4.

In Figs. 1 through 3 the peening apparatus is shown to include a cabinet and housing generally indicated at 10 supported on legs 11, and including front, rear and opposite end walls 12 through 14. The front wall of the endwise elongated opening 15 is covered by a removable closure 16, which includes upper and lower closure halves 17 and 18 hinged at 19 and 20 respectively to swing outward exposing the opening 15 through which an endwise elongated, heavy crankshaft 21 may be inserted or withdrawn. The closure half 18 contains a pair of windows 22 through which the operator standing on the platform 23 may view the crankshaft 21 in the peening chamber 24 during treatment of the crankshaft, as will be described.

Shot particles 25 are supplied to the peening apparatus through the opening 15 when the closure half 18 is swung away to open position, these particles collecting in an enlarged downwardly and centrally tapered hopper 26 directly beneath the peening zone 24. Shot particles in the hopper are drawn upwardly through shot supply hoses 27 to a pair of nozzles 28 from which the shot particles entrained in air streams are jetted downwardly into the peening zone toward the crankshaft 21. Such upward delivery of the shot through the hoses 27 is effected by the inducing action of compressed air fed to the nozzles 28 through air hoses 29, auxiliary air drawn into the inlet ends of the shot hoses 27 acting to entrain the shot particles and carry them upward to the nozzles. An elevator hose 30 is also connected into the bottom of the hopper 26 for removing shot upwardly to a conditioner generally indicated at 31, wherein the shot particles are screened and returned to the hopper in uncontaminated condition. The elevator hose is also usable to remove shot from the hopper as desired.

Extending horizontally and longitudinally in generally parallel relation within the peening chamber 24 are three cylinders 32—34, all of them being mounted at their opposite ends for axial rotation by suitable yokes in removable pillow blocks 35 as viewed in Figs. 1 to 3. The two upper rolls 32 and 33 are spaced apart laterally at the same elevation, whereas the lower roll 34 is spaced below the upper rolls and extends in a vertical longitudinal plane midway between the two upper rolls. Extending about all of the rolls is a series of longitudinally spaced belt slings 36, these being shiftable lengthwise of the rolls at the will of the operator standing on the platform 23 and reaching through the opened-up housing or the cabinet. Such shiftability of the belt slings is desirable to place them in undersupporting relation with the main journals 37 of the heavy crankshaft, as better seen in Figs. 2 and 3. Since the lengths of the belts are greater than the peripheral distance about the rolls 32—34 in vertical lateral planes, the belt portions 38 sag downwardly in V-shaped configuration under the weight of the crankshaft, so that the latter is centered over the drive roll 34 therebeneath, with the crankshaft of course everywhere upwardly spaced above the drive roll. Also, the support rolls 32 and 33 are laterally spaced apart sufficiently to accommodate downward insertion and upward withdrawal of the crankshaft 32 during loading and unloading of the peening apparatus.

Downward loading of the upper V portion 38 of the belt slings 36 serves to tighten them about all of the rolls and in frictional engagement with the drive roll and crankshaft main bearings, so that drive transmitted to roll 34 serves to feed the belts under the crankshaft main journals, and acting to rotate the crankshaft in the peening chamber. In Figs. 1 and 3 is illustrated the manner in which drive is transmitted to roll 34, as by the motor 40, speed reducer 41, and the sprocket of chain mechanism 42. Typical belt slings will comprise flat or timing belts constructed of rubberized fabric so as to undergo minimum wear during impact of shot particles thereon in the peening zone. Whenever it is necessary to change the belts, they are readily slipped off the rolls after the latter are lifted out of their pillow block and yoke end supports 35. Since the belt slings 36 are readily shiftable along the rolls, it is seen that different size crankshafts may be accommodated in the peening housing and chamber and desirably supported on the belt slings with minimum adjustment, and no extra support apparatus. Should a particular crankshaft be longer than the peening housing, an end plate 43 thereof is removable to expose an end opening of the housing through which the end portion of the crankshaft may project during peening treatment. Thereafter, the crankshaft may be endwise reversed and its unpeened end portion subjected to peening treatment in the chamber 24 as will be explained.

Turning now to Figs. 2 to 5 and 7, there is therein shown a traveling carrier assembly 44 for the nozzles 28, the assembly including a vertical support 45 suspended from a longitudinally and horizontally elongated track 46 in the upper interior region of the housing. Such suspension is effected by means of an inverted V-shaped bracket 47 connected to the support 45 through plates 48 at laterally opposite ends of the track 46, the V bracket 47 extending over the track. Sliders 49 connected to the bracket 47 bear against the inverted V track 46 on both legs thereof so as to center the support 45 for lengthwise sliding engagement therewith. The lower end portion of the support 45 is centered against lateral deviation by a slider block 50 carried on an arm 51 suspended from the vertical support 45, the slider block being centered between plates 52 and 53 mounted on the rear wall 13 of the housing, all as seen in Fig. 4.

The traveling carrier assembly also includes a pair of forwardly projecting arms 54 and 55, the former being joined to the vertical support 45, and the latter being supported on the arm 54 for forward and rearward sliding engagement therewith. Inverted V bracket portions 56 and 57 of the arms 54 and 55 are separated by buttons 155 acting to center the arms against longitudinal or sidewise displacement. The forward arm 55 carries a control box 58 projecting upwardly toward the upper closure 16 of the peening cabinet, the box and the arm 55 normally being in the path of insertion and withdrawal of the crankshaft 21 into and out of the peening zone 24, as viewed in Fig. 2 showing the nozzles in position for treating the crankshaft. When it is desired to insert or withdraw the crankshaft as described, the forward arm 55 is shifted rearwardly or leftwardly as viewed in Fig. 4 relative to the rearward arm 54, to carry the control box and arm 55 out of the path of crankshaft insertion and withdrawal. A locking handle 59 is operable to lock the arms 54 and 55 in any desired position, for the above purposes, handle rotation acting to displace a locking cam 60 into or out of frictional engagement with a plate 61 integral with the rear arm as seen in Fig. 5.

Turning now to Figs. 10 and 11, the control box 58 is seen to contain a nozzle actuator preferably in the form of an air motor 62 having a shaft 63 projecting horizontally and longitudinally through opposite ends of the box. These shaft opposite ends carry blocks 64 having vertical through openings receiving the vertical rods 65 which are adjustable upwardly or downwardly to set the desired height of the nozzles 28 with respect to the crankshaft. Set screws 66 carried in the block 64 and bearing against the rods 65 are used to set the desired height of the nozzles, for this purpose. Also, it is seen that the nozzles may be rotated about the axes of rods 65 to further orient them with respect to the crankshaft, and the nozzles may also be rotated about the lateral axes of the support sleeves 67, as controlled by the tightening nuts 68, to give them the desired angular directional orientation in vertical longitudinal planes. Thus, the nozzles are typically canted as shown in Fig. 3 so as to jet shot particles toward fillets at opposite sides of the crank throws shown generally at 70.

One of the blocks 64 mounts a sector plate 71 which in turn carries a pair of angularly laterally displaced stops 72. These are alternately engageable with a cam 73 on a valve control shaft 74, during operation of the motor 62, to swing the cam 73, shaft 64, and flip flop cams 75 on the shaft in the control box 58, for depressing alternate valve poppets 76. The latter in turn control the air valve 77 supplied with compressed air through conduit 78 so as to reverse the air motor 62 whenever one of the stops 72 engages the cam 73. Thus, the nozzles 28 are swung throughout a predetermined arc as generally indicated at 80 in Fig. 4, conforming with the lateral extent of the rotating crankshaft to be subjected to peening treatment. To increase the lateral extent of this peening arc at the crankshaft location, as for example as desirable when the crankshaft has increased overall lateral extent, it is only necessary to loosen the set screws 115 and reposition the stops 72 to form a larger arc.

Turning now to Figs. 2 through 4 and 7 and 8, the upright support 45 of the traveling carrier assembly 44 is shown to mount a pair of caster wheels 82 which are rotatable in a longitudinal vertical plane, and which are located at opposite sides of a helical flight portion 83 of a conveyor screw 84. The latter extends longitudinally within the housing at the rear thereof and above the level of the arms 54 and 55 so as to be remote from the peening zone 24 filled with jetted and rebounding shot particles. The conveyor screw is rotated during a peening operation by a suitable motor 85 and variable speed drive unit 86 shown in Fig. 1 at the ouside of the cabinet. Such rotation effects travel of the carrier assembly 44 lengthwise of the crankshaft 21 and longitudinally in the housing so as to move the nozzles along the crankshaft at a fixed predetermined distance thereabove. The conveyor screw drive is reversed after predetermined travel of the nozzles longitudinally of the crankshaft and then stops after one round trip or cycle of nozzle travel in response to a control mechanism which will now be described.

As shown in Figs. 2, 3, 4, 7 and 9, the traveling carrier assembly mounts a parallelogram plate 87 extending in a longitudinal vertical plane above the conveyor screw 84, the angled opposite edges 88 and 89 being engageable with laterally projecting arms 90 shown spaced apart longitudinally in Fig. 3. Arms 90 are in turn carried by clamps 91 shiftable along the diamond-shaped track 92 to predetermined locations corresponding to the longitudinal travel limits of the carrier assembly 44. At these locations the clamps are tightenable about the track as by rotating the handle 93 operating by a screw mechanism to draw the brackets 94 on the clamps closer together.

Figure 9:
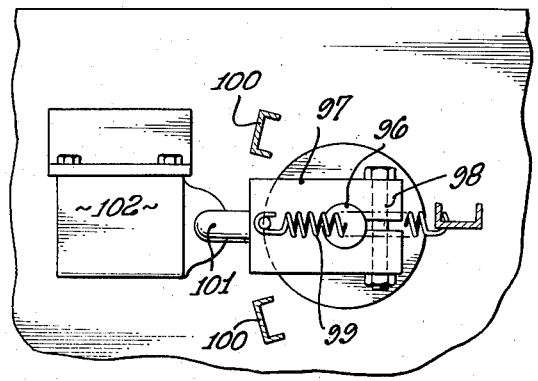
Fig. 9 is a view taken on line 9—9 of Fig. 3.
Figure 8:
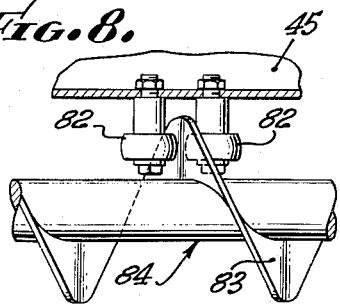
Fig. 8 is a fragmentary plan view taken on line 8—8 of Fig. 7.

Upon such engagement of the angled edges 88 and 89 of the plate 87 with the arms 90, it will be seen that the latter are displaced downwardly or upwardly as the case may be according to which of the edges 88 and 89 is engaging the arms, thereby rotating the track 92 which is supported at its opposite ends by stub shafts 96 projecting through bearings 197. The shaft 96 is shown in Fig. 9 to mount a motion plate 97 which is clamped on the shaft by the bolt 98 so as to rotate therewith. An over-center spring 99 biases the plate and therefore the shaft 96 and the track 92 either upwardly or downwardly as the case may be, and as controlled by the stops 100 against which the motion plate 97 bears in its angular upward or downward positions. When it is shifted either upwardly or downwardly due to such engagement of the parallelogram plate 87 with either of the arms 90, a projecting arm 101 engaged in a slot on the plate 97 and pivoted in limit switch 102, operates the limit switch controlling reversal of drive to the conveyor screw 84, as previously described. Thus, when the traveling carrier assembly 44 reaches the point during its longitudinal displacement when reversal of endwise travel is desired, the screw conveyor reverses its direction of rotation to travel the carrier assembly backwardly until it reaches the predetermined starting location at which point motion plate 97 causes rotation that operates limit switch 102 which stops the conveyor screw and shot peening action. Thus, the nozzles are then in position to start on the next crankshaft. By appropriate adjustment of the variable speed drive, the nozzle traverse can be timed to give necessary and sufficient peening treatment of any particular crankshaft, eliminating any supersaturation.

It will be seen from the foregoing that the crankshaft will be subjected to thorough peening treatment with minimum destructive peening erosion of the drive and oscillating components of the apparatus due to the use of belt slings for supporting the crankshaft, and as a result of the location of the traveling carriage and nozzle oscillating mechanism including the conveyor screw well above the peening zone. Furthermore, the housing of the air motor and valve control apparatus therefor in a control box isolates it from shot particle rebounding upwardly from the peening zone, and, the use of a screw conveyor having a large helical flight loosely engageable with the rubber covered caster wheels 82 on the traveling carriage prevents operating difficulties which otherwise would arise should small shot particles jam in closely fitting parts. Any such particles entering between the caster wheels and screw conveyor flight are rapidly expelled due to the loose fit therebetween and the openly exposed condition thereof. Furthermore, it will be seen that the arrangements of all of the other components within the housing is such as to eliminate or minimize the chances of shot particles jamming between relatively movable parts or components to cause malfunction thereof.

Fig. 1 shows that air is delivered through a main conduit 110 through a valve 111 to air supply conduits 29 which enter the apparatus through the hopper 26. The rubber hoses 27 and 29 for the shot and air supply are sufficiently long to permit extreme shifting of the nozzles and travel of the carriage assembly throughout the length of the apparatus without binding of the hoses. Also the nozzles may be reversed as respects their longitudinally spaced positions during certain peening operations.

Fig. 6 shows that the stop 72 on the sector plate 71 are adjustable angularly thereon so as to be moved closer together or further apart to vary the angular oscillation of the peening nozzles, a set screw 115 bearing against the plate 71 and carried by a bracket 116 on a stop 72 being provided for this purpose. A flange 117 on the plate prevents radial withdrawal of the set screw and hence the stop 72 away from the plate.

We claim:

1. Apparatus for shot peening multiple surfaces of a horizontally axially elongated crankshaft work body and that extend substantially parallel to the body axis and normal thereto, said apparatus comprising an upright housing containing a horizontal work zone having forward and rearward elongation for receiving the work body to extend in substantially axially horizontal position therein, flexible endless belt slings extending in substantially parallel vertically looping paths in the housing and horizontally spaced apart in said zone to support the body, rotary means for supporting the slings and for advancing the slings along said looping paths whereby to rotate the body in position, said rotary means including longitudinally extending rolls two of which are transversely spaced apart and a third of which is lower than said two rolls, said slings extending about said rolls and being bodily relatively shiftable forwardly and rearwardly therealong into a large number of different body supporitng positions in which the slings are adapted to be advanced by said rotary means, nozzle means in the housing including a pair of nozzles directed downwardly toward the elongated central region of said zone with angular deviation from the vertical for jetting air entrained shot particles against the body multiple surfaces, one of said nozzles being directed downwardly and forwardly and the other nozzle being directed downwardly and rearwardly, and means for traveling the nozzle means longitudinally over said zone and for oscillating the nozzle means transversely over said zone while maintaining nozzle directional angular deviation from the vertical, whereby the body surfaces may be subjected to thorough peening treatment.

2. The invention as defined in claim 1, in which said nozzle traveling means includes a traveling assembly supporting the nozzles, and a longitudinally extending screw conveyor operable in the housing to displace said assembly longitudinally.

3. The invention as defined in claim 1 in which said nozzle traveling means includes a traveling assembly supporting the nozzles, a reversible drive for traveling said assembly in opposite directions, longitudinally spaced limits engageable by said traveling assembly, and means for reversing the direction of said drive and then stopping said drive in response to engagement of said traveling assembly with said respective limits.

4. The invention as defined in claim 1 in which said nozzle traveling means includes a traveling assembly, said assembly including an actuator for rotating the nozzles in opposite directions about a longitudinal axis, and means including laterally spaced limits for controlling said actuator to reverse the directions of nozzle rotation in response to predetermined angular movement of the nozzles about said axis.

5. The invention as defined in claim 4 in which said actuator has a longitudinally extending shaft carrying said nozzles at longitudinally spaced intervals, said limits and nozzles being rotatable by said shaft in said opposite directions.

6. The invention as defined in claim 5 in which said actuator comprises an air motor, and in which said actuator control means includes air valves and cam means for operating said valves in response to engagement of said limits therewith.

References Cited in the file of this patent

UNITED STATES PATENTS

| | | |
|---|---|---|
| 779,468 | Crosby | Jan. 10, 1905 |
| 1,882,442 | Peik | Oct. 11, 1932 |
| 2,154,879 | Turnbull | Apr. 18, 1939 |
| 2,154,883 | Zahn | Apr. 18, 1939 |
| 2,357,599 | Mott | Sept. 5, 1944 |
| 2,436,928 | Kempe | Mar. 2, 1948 |
| 2,489,877 | Fowler | Nov. 29, 1949 |
| 2,590,819 | Huyett | Mar. 25, 1952 |

FOREIGN PATENTS

| | | |
|---|---|---|
| 6,780 | Great Britain | Mar. 17, 1914 |
| 13,808 | Australia | June 12, 1928 |
| 273,065 | Great Britain | June 30, 1927 |
| 571,001 | Germany | Feb. 25, 1933 |